United States Patent Office 3,214,338
Patented Oct. 26, 1965

3,214,338
MEDICAMENT RELEASING FILM-FORMING
OINTMENTS AND PROCESS OF MAKING
Joseph Ronald Ehrlich, 1793 Riverside Drive,
New York, N.Y.
No Drawing. Filed July 31, 1964, Ser. No. 386,774
10 Claims. (Cl. 167—63)

This application is a continuation-in-part of copending application Serial No. 42,990, filed July 15, 1960, now abandoned.

The present invention relates generally to topical ointments and more particularly to a novel type of ointment base whose novel features will become apparent as this description progresses.

Ointments or salves have been a known type of medication for ages. They are semi-solid, compound materials of a paste- or jelly-like consistency. They may serve as emollients, as protective materials and mainly for medicinal purposes by bringing pharmaceuticals, drugs, etc. into direct contact with the body part to be treated. There are salves or ointments for ophthamological (applied to the eye), for topical application to the skin, etc. This invention refers exclusively to topical ointments.

A topical ointment consists of an ointment base which represents the major portion of and any one of the various medicines or conditioners which are needed or required in any specific case. The base serves as the carrier for the medicine and also is mainly responsible for the paste- or jelly-like consistency of the ointment. Different ointment bases are known, the oldest and best known to be the oleaginous bases. Ointment bases may consist of or comprise either animal, vegetable or mineral oils, fats, greases or waxes, or a blend of them; they are the longest known bases; or of oil-in-water or water-in-oil emulsion of such fats, oils, greases and waxes, or blends of them. They can be polyglycols, blends of glycerin with gelatin, vegetable gums or processed products, such as alginates or cellulose derivatives; they might contain other thickening agents; or they might be semi-solid wax melts. In the latter cases they are more often referred to as pastes or dressings, rather than as ointments.

The use of topical ointments in applying a certain medication is indicated where the active material should stay in prolonged contact with the skin and is difficult to apply otherwise, such as an insoluble powder which, by itself, might easily dust off. In other cases the ointment base can serve as a diluent, where the application of a 100% pure drug might prove to be too strong or irritant, such as in the case of tars, mustard, iodine, etc. Sometimes, it has also protective functions (to protect against water, air, dust, etc.). As it can be seen, an ointment base has its function even in cases when it does not take any direct active part in the intended cure. The use of an ointment as emolient is outside the scope of this invention. Though a good ointment base should be substantially neutral and inert, it might, however, influence the action of the medicine. Certain medicines might be better released or absorbed by the skin from a hydrophylic base than from a hydrophobic base or vice-versa; some medicines are oil soluble, others water-soluble or emulsifiable.

However, all know ointments which are spreadable at room temperature without pre-heating have one great common disadvantage which has its cause in the physical properties of their respective bases. All known ointments are smeary and substantially non-drying. The expression "non-drying" is used here to express the fact that they do not dry quickly, that is within minutes. Some ointments might dry with the time to become either sticky or caking or crumbling messes. In the practical application of ointments it is either necessary to rub them into the skin until they are absorbed or to cover them with a bandage. Unless either one of the two alternatives is being used, the ointment, for all practical purposes, will wipe off in no time, smear all over, instead of staying in the place where it is supposed to be, and probably will soil clothing, underwear, bed linen, etc., as the case might be. If an ointment is covered by a bandage, gauze, etc., the major part of the ointment will be absorbed by the bandage, and thus, after a while, be drawn away from the place of application as the ointment continues to spread through the fibers of the bandage; it might even appear on the outside of the bandage. Because of this, an uneconomic excess of ointment, unnecessary for the cure itself, must be applied which, in turn, causes even more widespread distribution of ointment in the bandage. If an impervious plaster or a combination gauze and pressure sensitive tape is used to cover the ointment, the latter will soon ooze out underneath and often loosen the adhesion between plaster and skin.

The main objective of this invention is to overcome the above disadvantage and to provide ointments and ointment bases which are self-sealing almost immediately after they are spread over a surface. It is an objective of this invention to provide for non-irritant, smooth, easily spreadable ointments which will form a dry, non-sticky, flexible, protective surface skin which permits the passage of water vapor and good medicine release.

It is a further objective of this invention to provide a film-forming ointment which can be easily applied and removed, the latter without pulling or the use of solvents.

Another object of the invention is to provide an ointment base which not only facilitates the dispersion of insoluble material and keep such insoluble material dispersed without settling out, but which also permits to dissolve in it or to emulsify with it certain water-soluble, oil-insoluble, as well as certain oil-soluble, water-insoluble ingredients and to dissolve certain materials which are insoluble in both, water and oils, thus broadening and improving the applicability for some pharmaceuticals and drugs.

It is still another objective of this invention to provide a self-sealing ointment base with active ingredients which can be applied in sufficiently thick layers so as to provide a sort of cushion protection without the need of a bandage or plaster.

Finally, one more objective of this invention is to provide a self-sealing ointment base which, either by itself, or combined with drugs or pharmaceuticals can serve as a protective plaster or bandage. When combined with medicine, such a bandage will provide continuous release of and contact with medicine over a prolonged period.

I have discovered that it is possible to make a great variety of topical ointments by using a properly plasticized and neutralized special type polyvinyl acetate-water dispersion as a base. Such polyvinyl acetate dispersions have proved to be non-toxic, non-irritant and non-sensitizing.

Commercial polyvinyl acetate dispersions come with a maximum solid content of about 55%, sometimes less, hardly any more than 57%. They are freely flowing liquids of lower or higher viscosity, depending on molecular weight and particle size of the polyvinyl acetate; in that form they are too fluid to be used as an ointment base which should be a semi-solid or paste.

It would be easy to transform such liquid polyvinyl acetate dispersions into paste-like materials by adding a few percent of any one of the well-known thickening agents for polyvinyl acetate. Such thickening agents, to mention just a few of them, could be CMC (sodium carboxy methylcellulose) polyvinyl alcohol, natural gums, such as e.g. karaya gum, etc. However, while such thickened polyvinyl acetate dispersion might have the appearance of a paste, it still contains too much water, and the drying time to obtain a dry film on a comparatively non-absorbent base, such as living skin, is too long for practical purposes.

An improved material can be obtained by adding a relatively large amount of a non-toxic plasticizer to a polyvinyl acetate dispersion with substantially 55% solid contents.

It is customary to use polyivnylacetate dispersions in the preparation of coatings, adhesives, impregnants, etc. and to add to such formulations plasticizers. To prepare non-tacky films, 25% to 35% of plasticizers, based on the weight of the solid polyvinyl acetate is customary, and up to 50% to obtain tacky, soft films as used, e.g. in adhesives. I have found that certain plasticizers, added to a polyvinyl acetate (hereinafter referred to as PVAc) dispersion at the abnormal high ratio of 79–80% of the weight of solid PVAc can turn a liquid PVAc dispersion of 55% solid contents into a very thin, semi-liquid, soft paste, while the water content at the same time is depressed to about 31% to 32%. Such a paste, with proper active ingredients can yield workable ointments, especially when such ingredients are dry, insoluble powders, such as zinc oxide, bismuth subgallate, zinc stearate, etc. Depending on temperature and humidity conditions, such ointments may form a film which is substantially dry on the skin within 4 to 8 minutes and which retains only a slight tackiness.

In order to obtain an ointment which can dry in less than four minutes, preferably within ½ to 3 minutes, being dry to the touch, and which will remain perma- 29% water, preferably 15% to 25%. I also found that in order to obtain a smooth, spreadable ointment it is necessary that such PVAc dispersion in addition to a low water content must at the same time have a relatively low nently non-tacky, I found that it is necessary to work with a polyvinyl acetate dispersion, containing less than PVAc solid contents less than 56%, and preferably 30% to 50%. I discovered and developed a method of how to overcome this apparent discrepancy.

In preparing said dispersion I am using a special type of polyvinyl acetate resin as described in U.S. Patent No. 2,800,463. These polyvinyl acetate resins are re-dispersible, spray-dried or freeze-dried powders containing original emulsifier as contained in the original aqueous resin emulsion from which they are derived. These spray-dried polyvinyl acetate powders, after being re-dispersed in water, may form either re-dispersible or non-redispersible films after drying, depending from which type of PVAc dispersion they are derived. Both types can be used for the purpose of the present invention, and, depending on the end use either one of both types might be preferable.

Resins which are manufactured in accordance with U.S. Patent No. 2,800,463 are primarily used for reconstituting polyvinyl acetate dispersions in water which are similar to those dispersions from which the powdered resins are derived. Commercial polyvinyl acetate dispersions are produced by emulsion polymerization, normally with a solids content of 55% to 57%, the balance being substantially water. By adding spray-dried polyvinyl acetate powder to such commercial dispersions, or in the course of reconstituting dispersions with spray-dried PVAc powder it is possible to increase the solids content of aqueous polyvinyl acetate dispersions to as much as 70%. As spray-dried and freeze-dried polyvinyl acetate powders are substantially identical, they can be interchanged or combined, and, therefore when spray-dried polyvinyl acetate is referred to herein, it is meant to include freeze-dried polyvinyl acetate, and the expression is used to refer to either one of them. Such a 70% solids dispersion is a very viscous liquid. Adding only 1% more resin, or rather using only 29% water instead of 30% water to prepare said dispersion, the 1% above 70% not necessarily having to be resin but being any other compatible water-soluble or insoluble material changes the heavy liquid spontaneously into a non-spreadable dough-like paste. A blend of 71.5 parts of resin or slightly more than 28.5 parts or slightly less water yields a tacky dough which becomes crumbly on drying. One of the advantages of using polyvinyl acetate dispersions with solids content of more than 55% is the fact that such dispersions can dry fast, with less water to evaporate, especially when applied to highly absorbent bases such as paper, cloth, etc. However, a liquid even when viscous is not a very desirable base for an ointment. The transition from liquid to dough is very abrupt with polyvinyl acetate dispersions with increasing solids content, with no phase of spreadable paste in between.

However, I discovered that it is possible to transform those liquid PVAc dispersions into spreadable paste-like semi-solids by decreasing rather the PVAc content than increasing it; decreasing it below 56% and even down to as low as 30%. This is unobvious, surprising and unexpected. This can be accomplished by shifting the percentual distribution of all ingredients by the addition of the spray- or freeze-dried type to a commercial PVAc dispersion of 55% solids and simultaneous dilution with plasticizer and/or other diluents whereby the PVAc content and the water content are actually reduced. Another method is to build up the ointment base exclusively from spray- or freeze-dried PVAc, preferably by using a mixing technique which is different from the customary procedure. I also developed, with the help of numerous experiments, a number of formulations which have to meet certain rules, as will be outlined later on. These formulations produce ideal new ointment bases and, in particular, ointments which are self-sealing and which heretofore have never been proposed. My technique also involves the use of certain substantially water-insoluble plasticizers.

When "certain" plasticizers are referred to herein, it has to be borne in mind that there can be used for ointments only plasticizers which are known to be non-toxic, non-irritant and non-sensitizing. Practical tests have shown that liquid plasticizers which have been accepted for safe use by the U.S. Food and Drug Administration for use in packaging or otherwise in contact with food, and having good or even limited compatability with polyvinyl acetate, either in the absence or presence of water meet the above specifications, regardless as to what chemical family such plasticizers may belong, and regardless whether all the members of any particular chemical family or only individual members of such family have been accepted by the Food and Drug Administration.

The following are examples of such accepted plasticizers which may be used either alone or blended with each other: Di(2-ethylhexyl) adipate, diisobutyl adipate, diisodecyl adipate, di-n-octyldecyl adipate, dibenzyl adipate, dibutoxyethyl adipate, didecyl adipate, diisooctyl adipate, tributyl citrate, acetyltributyl citrate, triethyl citrate, acetyltriethyl citrate, ethylphthalyl ethyl glycolate, butylphthalyl butyl glycolate, methylphthalyl ethyl glycolate, diethylphthalate, dioctylphthalate, diisooctylphthalate, octyldecylphthalate, butylbenzyl phthalate, butyldecyl phthalate, butyloctyl phthalate, di(butoxy ethyl) phthalate, dibutyl phthalate, di(2-ethylhexyl) hexahydrophthalate, dihexylphthalate, dihydroabietyl phthalate, diisobutyl phthalate, diisodecyl phthalate, dimethyl phthalate, didecyl phthalate, n-amyl n-decyl phthalate, triethyl phosphate, tributyl phosphate, triethylhexyl phosphate, diphenyl-2-ethylhexyl phosphate, diisooctyl phosphate, cresyl diphenyl phosphate, dibutyl sebacate, dioctyl sebacate, diisooctyl sebacate, dibutyl tartrate, dicyclohexyl tartrate, butylacetyl ricinoleate, butyl stearate, butyl laurate, butyl oleate, dibutyl maleate, butyl oleate, dipropyleneglycol dibenzoate, di n-hexyl azelate, p-tert. butylphenyl salicylate, monoisopropyl citrate, monostearyl citrate, distearyl citrate and tristearyl citrate, etc.

PVAc dispersions prepared from spray-dried PVAc powder as suggested by U.S. Patent No. 2,800,463 can be considered to be similar to commercial, emulsion-polymerized PVAc dispersions, except that concentrations up to 70% are possible. Though even the films produced from such PVAc dispersions might be similar to films produced from solvent solutions of bulk-polymerized PVAc, the spray-dried PVAc itself, however, is different polyvinyl acetate produced in any other way, and so are certain dispersions made with it. While suggestions in the specification of U.S. Patent No. 2,800,463 indicate that various uses and products can be made of spray-dried PVAc for which emulsion-polymerized PVAc is known, I have discovered that new products can be made from spray-dried PVAc which cannot be made from any other known form of PVAc, and which are in no way suggested by said U.S. Patent No. 2,800,463. One of those products is a water-free, non-drying modelling clay which will be the subject of a separate patent application. Another product is the object of this invention.

When spray- or freeze-dried polyvinyl acetate powder is dispersed in water, the dispersion up to 70% solids content is liquid. I discovered that well spreadable pastes can be produced when less resin powder is dispersed, and when it is dispersed in water in the presence of such plasticizers as mentioned before or vice versa. The various plasticizers in question are not miscible with water, and when both liquids are in the same container they form two layers, with either the water or the plasticizer floating on top, depending on the specific gravity of the latter. No high speed stirring is required. As soon as the resin is in the mixing vessel a slow-speed dough mixer or paddle-mixer transforms the blend into a uniform paste. From very smooth to stiff pastes can thus be prepared, depending on formulation; however, a great many experiments have shown that desirable pastes which can serve as base for ointments can be produced in this way only if certain rules and limitations are observed. An ointment base should be a semi-solid, readily spreadable paste, not a flowing liquid, not a kneadable dough. A self-sealing ointment should dry in less than four minutes, preferably within 1 to 3 minutes at average temperature and humidity conditions under a moderate climate. While the drying time should be conveniently short, the ointment must not dry too quickly, so that it can be spread over larger surfaces without unnecessary haste. The ultimately resulting film must not be tacky. In order to meet all these specifications, I have found that the formulations must meet the following requirements:

(1) The polyvinyl acetate contents must not be more than 56%, preferably 30%–50%;

(2) The combined water and plasticizer contents must not be less than 35% and not more than 50% of the total composition, preferably 38% to 46%;

(3) The ratio of plasticizer must not be more than 80% and not less than 35% of the weight of the polyvinyl acetate, preferably 45% to 60%;

(4) The water content must be below 28.9%, preferably 15% to 25%.

Any formulation must meet all four requirements at the same time.

Though ointments can be prepared with polyvinyl acetate dispersions which eventually will form a film, by using formulations which do not follow all the four requirements as stipulated above, it has been found that any formulation, even if it were lacking only in one of the four stated requirements, is at least lacking in one of the desirable properties. It will be later demonstrated in the examples that any formula outside said requirements will yield an ointment base which is either liquid or a non-spreadable dough, slow-drying, or is yielding tacky films, or too dry, stiff or forms scaly films.

I have further found that the sequence in which the addition of the individual components takes place when the described ointment bases are compounded, has a considerable influence on certain properties of the finished bases, even when their qualitative and quantitative composition is identical. The following example shall illustrate this phenomenon: The formula in both cases is composed of 25% water; 40% of spray-dried PVAc, of the type yielding a non-redispersible film; 22% plasticizer; 13% polyvinyl pyrrolidone (PVP). When the components are added in the following sequence under agitation: (1) water, (2) PVAc, (3) plasticizer, (4) PVP, the paste is thin and dries within 4 to 6 minutes on a warm and humid day. However, when the sequence is as follows: (1) water, (2) plasticizer, (3) PVAc, (4) PVP, the result is a thick paste which dries in 3 to 3½ minutes under the same conditions to a film which is dry to the touch and remains permanently non-tacky. The explanation for this strange behavior may perhaps be found in the fact that the spray- or freeze-dried PVAc powders congeal in the plasticizer which I am using, whereas they disperse freely in water. Therefore, when the dispersion of the PVAc takes place in the absence of plasticizer, with the plasticizer added later, which is the customary way of plasticizing PVAc dispersions, the paste is comparatively thin. Whereas, when the dispersion of the PVAc takes place in the presence of the plasticizer which is capable of congealing the PVAc said congealing effect is perhaps exerted to a certain degree, resulting in a less mobile dispersion with quicker water release. When spray- or freeze-dried PVAc powder is added to a commercial PVAc dispersion for shifting the percentual distribution of the components with about one half of the PVAc already dispersed, the difference in properties is much less pronounced with reversed sequence of addition of plasticizers, as can be expected, assuming the correctness of the above explanation.

As already mentioned, I can use spray- or freeze-dried PVAc powder which yield either films which are redispersible or non-redispersible; I can use such PVAc powders which are either compatible or incompatible with starch, dextrin, boric acid or its derivatives. All these different types of PVAc are well known to the art and do not require any description.

When looking at the preferred ratios mentioned in the four rules, even at their upper limits, it becomes evident that the PVAc resin, the plasticizer and the water alone do not make up any preferred formula, though it is possible and within the scope of this invention to prepare ointment bases for certain uses from these three components under the prescribed conditions. But this refers to the base only, not to the ointments, as active ingredients must always be added to said base.

To control spreadability, drying time, shelf-life, pH, etc., other additives may be incorporated in the ointment base. As polyvinyl acetate dispersions are slightly on the acid side, with a varying pH of 4.5 to 6, a small amount of a mildly alkaline material can be added, such as sodium bicarbonate, magnesium oxide, zinc oxide, etc. These are all substances which can frequently be found in ointments. Sodium bicarbonate can be directly dissolved in the water used for the dispersion or in the polyvinyl acetate dispersion, if the latter is being used as the examples will show. In general, from 1.4 to 2.0 sodium bicarbonate for every 100 g. of solid polyvinyl acetate will bring any dispersion made in accordance with this specification to a pH of 7. For certain formulations I like to add other medically nonactive, water-soluble materials, film-forming or not film-forming, which may increase or decrease the water sensitivity of the ointment base, increase or decrease the spreadability or otherwise modify the properties of the base. E.g., the addition of a certain amount of polyvinyl pyrrolidone increases the water sensitivity of the base, contributes (though not a thickening agent) to the thickening of the paste and therefore permits the reduction of the polyvinyl acetate contents; it also adds de-toxifying properties to the base which may usefully modify the properties of certain medicines or additives as will become apparent from examples. When a starch compatible polyvinyl acetate is being used, starch, dextrin, water-soluble polysaccharides, etherified polymeric carbohydrates can be added. The addition of very small amounts of polyglycols, poly oxi ethylenes, sugars or other materials make the films more detachable from the skin. Very small amounts of antioxidants may improve color stability. The addition of very small amounts of water repellents, such as silicon resin dispersions or silicon fluids are useful for outdoor preparations when the base is being used as a protective bandage for tree surgery, plant grafting, etc. If any one of the additives increases the viscosity of the water too much, it might be necessary to change the mixing method in order to avoid sudden coagulation. Instead of adding the spray- or freeze-dried resin to both, the water and the plasticizer, some of the spray- or freeze-dried resin is first added to the water containing the additive and mixed, then some plasticizer is added under continuous mixing, some more resin, then some more plasticizer and so on until all ingredients of the formula are blended together.

All the films laid down from these self-sealing ointments have a good rate of water vapor transmission which not only permits the skin underneath to "breathe," but also makes it possible to apply layers of considerable thickness. Such thick layers form just as quickly a thin, dry surface skin over the non-dried portion of the ointment underneath, as a thin layer would do over the skin. Gradually, all the ointment transforms into a solid film, while the small percentage of water, contained in the ointment, passes through the dry surface skin. Thick layers have the advantage that they might provide a cushion effect, if the ointment were to be applied over a sensitive spot, such as a cut or puncture.

The films from these ointments provide in general a good medicine release. These self-sealing ointments release the active ingredients sometimes at a lower rate of speed than conventional ointments do, thus, with the ointment securely fixed in place providing for a continuous and prolonged action. This permits better dosage control. Because of this continuous and prolonged action the self-sealing ointments can also in many cases replace so-called liniments. "Camphorated oil" e.g. is such a liquid liniment, a camphor dispersion in cottonseed oil which, among others, is being used as a mild counterirritant for inflamed joints, sprains, rheumatism or other inflammatory conditions. A camphorated self-sealing ointment provides a continuously camphor releasing skin over such diseased spots as long as said camphorated film is permitted to stay on. The camphorated self-sealing ointment which will be described in detail among the examples is also proof of ease of release of active ingredients from the self-sealing ointment films. As long as the film is permitted to stay on the cooling and soothing sensation of the camphor can be felt on the skin.

The removal of the self-sealing ointment films is simple: it can be somewhat influenced by formulation as well as by the skin condition. On dry skin the film may lift itself off after two or three days. This can be facilitated by incorporating slightly smaller amounts of plasticizer into the ointments. However, if the film lifted itself off prematurely, that is, before one wishes to remove it, slight moistening with water will make the film re-adhere.

All self-sealing ointment films can, however, be readily removed from the skin with water and slight rubbing. No solvents or pulling is necessary. Due to the partly hydrophilic character of these self-sealing ointments, they can be applied and will adhere to moist skin. They can even be spread over slightly bleeding wounds and still will adhere and even eventually stop the bleeding, though the drying in such cases will require more time.

EXAMPLES

No. 1

| Formula: | Percent p. weight |
|---|---|
| PVAc spray-dried powder | 55.0 |
| Ethylphthalyl ethyl glycolate | 30.2 |
| Water | 14.0 |
| Sodium bicarbonate | .8 |

The sodium bicarbonate is first dissolved in the water and the plasticizer added, all three in the same mixing vessel. The polyvinyl acetate is slowly added to the two-layer liquid while agitating with moderate speed until a paste is formed. The PVAc is of the type which forms redispersible films. The pH of the paste is 7. This paste which has an extremely low water content can be easily spread and forms transparent films which dry within ½ to 2 minutes. This paste is an excellent ointment base to which active ingredients, for example, medicinal agents, can be added by mixing. Such active ingredients can be insoluble powders such as sulfur, bismuth subgallate, zinc oxide, etc. or oily or fatty materials such as lanolin, winter green oil, etc., or water-soluble materials, such as resorcinol, neomycin sulfate, etc. The oily or fatty substances easily emulsify with the paste. The water-soluble materials, after dispersion, dissolve slowly on standing in the dispersed water droplets. In this formula the combined water and plasticizer content is 44.2%; the ratio of plasticizer is 54.9% of the weight of the polyvinyl acetate. The films formed from ointments made with this base can be washed off with water and gentle rubbing; they will not come off by soaking with water alone, without mechanical action.

No. 2

| Formula: | Percent p. weight |
|---|---|
| PVAc | 50.00 |
| Ethylphthalyl ethyl glycolate | 29.65 |
| Water | 20.00 |
| Magnesium oxide | .35 |

The water and plasticizer go together into a mixing vessel, after which the PVAc powder, which is of the same type as in Example No. 1, and the magnesium oxide are dispersed in the two-layer liquid. The resulting smooth paste is neutral and dries within two to four minutes to a hazy film. The combined water-plasticizer content is 49.65%. The ratio of plasticizer is 59.3% of the weight of the PVAc. Active materials can be added to this ointment base in the same manner as in Example No. 1. Film behavior of the ointments is as in Example No. 1.

No. 3

| Formula: | Percent p. weight |
|---|---|
| PVAc | 32.00 |
| Ethylphthalyl ethyl glycolate | 24.50 |
| Water | 21.00 |
| Polyvinyl pyrrolidone | 12.80 |
| Ethylamino benzoate | 9.00 |
| Sodium bicarbonate | .50 |
| ASC–4 brand of Diaphene | .20 |

First the ethylaminobenzoate (Benzocain), which serves as a topical anesthetic and the ASC–4 brand of Diaphene, an antiseptic which is a mixture of 5,4'-dibromosalicyl anilide and 3,5,4'-tribromosalicyl anilide, are dissolved in the ethyl phthalyl ethyl glycolate with slight heating, and then permitted to cool down to about 30° C. The sodium bicarbonate is separately dissolved in the water, after which both solutions are put into the same mixing vessel. The PVAc powder and finally the polyvinyl pyrrolidone are dispersed in the two-layer liquid until a paste is formed.

The PVAc is of the same type as in Example No. 1. The polyvinyl pyrrolidone is a PVP K–30 with an average molecular weight of 40.000.

The combined water-plasticizer content is 45.5%; the ratio of plasticizer is 76.56% of the weight of the PVAc. The ointment is an easily spreadable, excellent wound sealer which dries within two to four minutes to a flexible, transparent film. This film is slightly more water sensitive than the films in Examples No. 1 and 2; it has a very good rate of water vapor transmission.

The active ingredients could be added directly to the finished paste; however, this example shows how a much quicker and more uniform distribution of active ingredients, especially of small quantities, can be achieved by the fact that water-insoluble ingredients can be dissolved in the plasticizer and the water soluble ingredients in the water, whereupon after the addition of the spray- or freeze-dried PVAc powder which contains original emulsifier, both, the water and the plasticizer phase emulsify easily.

There is no other straight or compounded ointment base known or in use which can offer the twofold facility of dissolving water-soluble and water-insoluble ingredients at the same time.

The ethylphthalyl ethyl glycolate in Examples No. 1 to 3 and in most of the following examples can be replaced without any change of formula by any one of the following plasticizers: Acetyl tributylcitrate, acetyl triethylcitrate, triethyl citrate, butylphthalyl butyl glycolate, diethylphthalate, diphenyl-2-ethylhexyl phosphate, triacetin, and possibly diisobutyl adipate, monoisopropyl acetate, mono, di and tristearyl citrate, p-tert.-butylphenyl salicylate.

No. 4
Formula: Percent p. weight
Commercial polyvinyl acetate dispersion 55%
  solids _____ 47.00
  Spray-dried PVAc _____ 21.00
  Diethyl phthalate _____ 23.80
  Polyvinyl pyrrolidone _____ 4.00
  Iodine _____ 3.50
  Sodium bicarbonate _____ .70

Finely powdered iodine is dissolved in the diethyl phthalate; the sodium bicarbonate and the polyvinyl pyrrolidone is added to the commercial PVAc dispersion with lively agitation. Then the iodine solution in diethyl phthalate is added, while agitation is continued, and finally the spray-dried PVAc is added.

The commercial PVAc dispersion is of the type which forms a non-dispersible film, whereas the spray-dried PVAc is one whose films are re-dispersible. The polyvinyl pyrrolidone helps dissolving and de-toxifying the iodine. The resulting ointment is a smoothly spreadable paste which can serve as a counter-irritant with local antibacterial activity. It dries within 1¾ to 2¼ minutes. It does not burn or sting on open wounds over which it forms a smooth, flexible skin. The total PVAc is 46.85%:

The combined water-plasticizer content is 44.95%.
The water content is 21.15%.
The ratio of plasticizer is 50.8% based on the total weight of PVAc.

No. 5
Formula: Percent p. weight
  Commercial PVAc dispersions (55% solids) _ 41.00
  Spray-dried PVAc powder _____ 20.30
  Ethylphthalyl ethyl glycolate _____ 26.00
  Camphor _____ 8.00
  Menthol _____ 4.00
  Sodium bicarbonate _____ .70

The camphor, menthol and plasticizer are gently heated together in the water bath until all is dissolved; when cooled down to about 30° C., the viscous solution is stirred into the PVAc dispersion and the sodium bicarbonate and spray-dried PVAc powder is added with sufficient agitation. The resulting paste is an excellently spreadable ointment which has counter-irritant, analgetic and anti-pruritic properties. It dries to a tack-free, flexible, transparent film in 2½ to 3 minutes which causes a cooling sensation on the skin as long as it stays on.

The PVAc dispersion yields non-dispersible films and the spray-dried PVAc yields re-dispersible films, which results in a somewhat more water-resistant film; however, this film comes off with washing (water plus gentle rubbing).

The total PVAc content is 42.85%.
The water content is 18.45%.
The combined water-plasticizer content is 44.45%.
The ratio of plasticizer is 61.39% based on the weight of PVAc.

No. 6
Formula: Percent p. weight
  PVAc spray-dried powder _____ 47.0
  Water _____ 25.0
  Acetyl triethylcitrate _____ 23.0
  Boric acid _____ 5.0

The boric acid is dissolved in the water at up to 50° C., and the solution added to the acetyl triethyl citrate. The spray-dried PVAc powder which is of the boric acid compatible type and which yields films which are non-dispersible, is added to the two-layer liquid with agitation until a smooth paste is formed which can be used as a self-sealing ointment for the treatment of eczema, epidermophytosis, bed sores, as an antibacterial agent, etc.

The combined water-plasticizer content is 48%. The ratio of plasticizer is 48.93% based on the PVAc content. The ointment dries in about 2½ minutes. However, this ointment has a short shelf life.

No. 7
Formula: Percent p. weight
  Commercial PVAc dispersion _____ 47.0
  Spray-dried PVAc powder _____ 21.0
  Diphenyl-2-ethylhexyl phosphate _____ 24.0
  Salicylic acid _____ 3.0
  Benzoic acid _____ 5.0

The salicylic and benzoic acids are dissolved in Diphenyl-2-ethylhexyl phosphate and this solution is added to the PVAc dispersion with agitation. Then the spray-dried PVAc powder is added until a smooth paste is formed. This ointment dries in 1½ to 2½ minutes. It has antifungal properties.

The total PVAc content is 46.85%.
The water content is 21.15%.
The combined water-plasticizer content is 45.15%. The ratio of plasticizer is 51.22% of the weight of the PVAc content.

No. 8
Formula: Percent p. weight
  Spray- or freeze-dried PVAc powder _____ 48.0
  Ethylphthalyl ethyl glycolate _____ 23.0
  Water _____ 21.0
  Water-soluble, commercial polysaccharide __ 8.0

This is a very smooth paste, almost a heavy liquid; to this is added 20 parts p. weight of zinc oxide, and the whole is thoroughly mixed until it is a uniform paste. This changes the composition to:

|  | Percent |
| --- | --- |
| PVAc | 40.00 |
| Plasticizer | [1]19.16 |
| Water | [1]17.50 |
| Poly saccharide | 6.67 |
| Zinc oxide | 16.67 |

[1] 36.66% combined.

This is a protective, astringent ointment which dries in two to three minutes. The ratio of plasticizer is 47.9% of the weight of the PVAc. The spray- or freeze-dried PVAc is a starch-compatible type which forms non-dispersible films.

No. 9

Formula: Parts p. weight

| | |
|---|---|
| Spray-dried PVAc | 30.00 |
| Water | 25.00 |
| Ethyl phthalyl ethyl glycolate | 23.00 |
| Etherified polymeric carbohydrate | 6.00 |
| Ethyl amino benzoate | 5.50 |
| Sodium carbonate | .50 |
| Precipitated or sublimed sulfur | 10.00 |

The spray-dried PVAc forms redispersible films. The etherified polymeric carbohydrate is of low viscosity and is one made by the Hercules Powder Company in Wilmington, Delaware, and called Ceron N, type 4–E. This etherified carbohydrate and sodium bicarbonate is first dissolved in part of the water with vigorous agitation; then a part of the plasticizer in which the ethyl amino benzoate has been dissolved is added and then a part of the PVAc powder is added with continuous mixing; then again some of the remaining water is added, some more plasticizer and some more PVAc powder. Alternating adding and mixing continues until all is transformed into a paste whereupon the sulfur is mixed in. This ointment dries in two to three minutes and can serve e.g. as a scabicide.

No. 10

Formula: Parts p. weight

I

| | |
|---|---|
| Water | 23.0 |
| Sodium bicarbonate | .8 |
| Neomycin sulfate (potency 677γ/mg.) | .4973 |
| Polymyxin B sulfate (potency 7880 u./mg.) | .1271 |
| Polyvinyl pyrrolidone | 1.3 |

II

| | |
|---|---|
| Dibutyl tartrate | 5.0 |
| Tributyl citrate | 5.3 |
| Ethylphthalyl ethyl glycolate | 12.0 |
| ½ sec. cellulose acetate butyrate | 1.5 |
| Butylated hydroxy toluene | .055 |
| ASC–4 brand of Diaphene | .1 |

III

| | |
|---|---|
| Spray-dried polyvinyl acetate | 48.3 |

IV

| | |
|---|---|
| Hydrogenated cottonseed oil | 2.0 |

The sodium bicarbonate, the two antibiotics and the PVP are dissolved in water.

(I) After dissolution, about one-half of (III) (polyvinyl acetate) is dispersed in (I) with strong agitation. The three plasticizers are mixed together in a separate vessel, the cellulose acetate, the anti-oxidant and the antiseptic are added and dissolved under heat and stirring (II).

(II) is slowly added to (I) under stirring. Now the remaining one-half of (III) (polyvinyl acetate) is added to (I) and (II), and the stirring continued for ten minutes; finally (IV) (the fat) is added.

The cellulose acetate butyrate adds to the film strength and the fat contributes to the surface smoothness of the film.

To test the medicine release of this ointment the following "in vitro" test was performed:

A small amount of ointment was tested on agar plate cultures of *M. pyrogenes* var. *aureus* and compared with a similar ointment not containing the antibiotics. The ointment containing the neomycin and polymyxin gave a fairly large zone of inhibition whereas the ointment alone produced no zone at all, indicating that the antibiotics were released from the base and were active.

No. 11

Formula: Parts p. weight

I

| | |
|---|---|
| Water | 28.6 |
| Sodium bicarbonate | .8 |

II

| | |
|---|---|
| Ethylphthalyl ethyl glycolate | 8.0 |
| Di-isooctyl sebacate | 5.0 |
| Butyl acetylricinoleate | 4.0 |
| Camphor | 1.5 |
| Menthol | .5 |
| Diaphene | .15 |
| Methylsalicylate | 5.0 |
| Butylated hydroxy toluene | .05 |

III

| | |
|---|---|
| Spray-dried PVAc | 44.0 |

IV

| | |
|---|---|
| Hydrogenated cottonseed oil | 2.0 |

Procedure as in Example No. 10.

This ointment forms a film on the skin which continuously gives a feeling of warmth. When the film is removed after 24 hours, the skin still has a strong odor of methyl salicylate and camphor. This ointment has an extended action as compared with similar rub-in ointments sometimes used for relieving rheumatic and muscular pain.

The foregoing examples give a general idea of how to go about preparing self-sealing ointments, liniments, dressings, plaster, etc. Water-soluble active ingredients are best dissolved in the water phase of the ointment base, and water-insoluble materials, if they have any solubility at all, are best dissolved in that type plasticizer which proves to be the best solvent. The water phase and plasticizer phase are then put together and the spray- or freeze-dried PVAc is added under mixing. This combines the water and plasticizer phase together with the dissolved additives to a paste. If it is desirable to blend a material which is not soluble in either phase the ointment base is best prepared first and the additives added last. They will be either emulsified or dispersed.

The invention is not limited to the foregoing examples and all kinds of variations with respect to percentual distribution and the nature of the base-forming additives and plasticizers in the polyvinyl acetate ointment base are contemplated. It is quite apparent that with respect to active ingredients, countless combinations are possible.

Bismuth subnitrate, coal tar, juniper tar, chrysarobin, ammoniated mercury, bacitracin, anthralin, benzene hexachloride, methylsalicylate, iodochlorohydroxiquin, ichthammol, antihystamines, antibiotics, etc. are some examples.

It is obvious that there is no limitation as to the additives in such self-sealing polyvinyl acetate based ointments.

It is further obvious that such ointment bases can be formulated to give more or less stiff films by varying the amount of plasticizer. For example, an ointment base which is useful for making sleeves around grafted plants can be made as follows:

| | Percent p. weight |
|---|---|
| PVAc spray-dried powder yielding non-dispersible film | 48 |
| Triacetin | 16 |
| Water | 25 |
| Polyvinyl pyrrolidone | 10 |
| Silicon-resin dispersion | 1 |

Any kind of active material can be added to this base. This ointment can be spread around a tree limb to be treated.

Despite the fact that PVP is hygroscopic, the above formulation yields a sufficiently stiff and water-resistant film.

Referring to the statements made in columns 5 to 6 regarding the shortcomings of formulations which lack any one of the four requirements called for in order to obtain preferred results the following examples are illustrative of a non-usable formulation and some usable but less desirable formulations:

| | Percent p. weight |
|---|---|
| Spray-dried PVAc | 70.71 |
| Plasticizer | 11.74 |
| Water | 17.65 |

This is a dough. Combined water-plasticizer is 29.39%. Plasticizer ratio is 16.60%. PVAc is over 56%.

| | Percent p. weight | |
|---|---|---|
| Spray-dried PVAc | 44.13 | |
| Plasticizer | 44.82 | |
| Water | 11.05 | 55.88 |

This is a paste, but film is permanently tacky.

| | Percent p. weight |
|---|---|
| Commercial PVAc dispersion | 75.19 |
| Plasticizer | 24.81 |

This is a liquid.

| | Percent p. weight |
|---|---|
| Total PVAc | 41.35 |
| Water | 33.84 |
| Combined water-plasticizer | 58.70 |

| | Percent p. weight |
|---|---|
| Spray-dried PVAc | 40 |
| Plasticizer | 40 |
| Water | 20 |
| Combined water-plasticizer | 60 |
| Ratio of plasticizer | 100 |

Excellent spread, dries two to five minutes, but film permanently tacky.

Since the spray-dried polyvinyl acetate and freeze-dried polyvinyl acetate have identical properties, one may be exchanged for the other, or combined in any of the aforementioned examples and formulations made in accordance with the invention.

Therefore, to avoid duplication or multiplicity of claims where the term "spray-dried" is used in the claims, said term shall be construed to include "freeze-dried."

I claim:
1. A topical non-tacky, spreadable ointment base capable of holding a uniformly dispersed solid medicine, said base being of pastelike consistency substantially free from thickening agents, tackifiers and volatile organic solvents which forms fast drying films and permits passage of water vapor and medicines, said base containing spray-dried, self-emulsifiable polyvinyl acetate powder, and said base containing not more than substantially 56% polyvinyl acetate by weight and not more than substantially 28.9% by weight of water, and at least one non-toxic, non-irritant, non-sensitizing plasticizer selected from the group consisting of diethylphthalate, di-iso-octylphthalate, dioctylphthalate, ethyl phthalyl ethylglycolate, butyl phthalyl butylglycolate, diphenyl-2-ethylhexylphosphate, acetyltributylcitrate, acetyltriethylcitrate and triethylcitrate, the combined water and plasticizer content of said base being substantially 35% to 50% by weight thereof and the ratio of said plasticizer being substantially 35% to 80% by weight of the total polyvinyl acetate.

2. Method of preparing medicated, topical, non-tacky, fast-drying, spreadable ointment of pastelike consistency comprising dissolving a water-soluble medicine in water, adding the resultant water-medicine solution to at least one non-toxic, non-irritating, non-sensitizing, non-water miscible plasticizer selected from the group consisting of diethylphthalate, di-isooctylphthalate, dioctylphthalate, ethyl phthalyl ethylglycolate, butyl phthalyl butylglycolate, dipenyl-2-ethylhexylphosphate, acetyltributylcitrate, acetyltriethylcitrate and triethylcitrate, to form a separate layer with the water phase, adding spray-dried, emulsifiable polyvinyl acetate powder, and agitating the whole until a smooth paste is formed, said paste containing not more than substantially 28.9% by weight of water, nor more than substantially 56% by weight of polyvinyl acetate, and a combined water and plasticizer content substantially from 35% to 50% by weight and a ratio of said plasticizer to polyvinyl acetate of substantially from 35% to 80% by weight of polyvinyl acetate.

3. Method of preparing medicated, topical, non-tacky, fast-drying, spreadable ointment of pastelike consistency comprising dissolving a water-soluble medicine in a liquid polyvinyl acetate water emulsion, adding the resultant medicine solution to at least one non-toxic, non-irritating, non-sensitizing, non-water miscible plasticizer selected from the group consisting of diethylphthalate, di-iso-octylphthalate, dioctylphthalate, ethyl phthalyl ethylglycolate, butylphthalyl butylglycolate, diphenyl-2-ethylhexylphosphate, acetyltributylcitrate, acetyltriethylcitrate and triethylcitrate, to form a separate layer with the water phase, adding spray-dried, emulsifiable polyvinyl acetate powder, and agitating the whole until a smooth paste is formed, said paste containing not more than substantially 28.9% by weight of water, nor more than substantially 56% by weight of polyvinyl acetate, and a combined water and plasticizer content substantially from 35% to 50% by weight and a ratio of said plasticizer to polyvinyl acetate of substantially from 35% to 80% by weight of polyvinyl acetate.

4. Method of preparing medicate, topical, non-tacky, fast-drying, spreadable ointment of pastelike consistency comprising dissolving a water-insoluble medicine, soluble in at least one non-toxic, non-irritating, non-sensitizing, non-water miscible plasticizer selected from the group consisting of diethylphthalate, di-iso-octylphthalate, dioctylphthalate, ethyl phthalyl ethylglycolate, butyl phthalyl butylglycolate, diphenyl-2-ethylhexylphosphate, acetyltributylcitrate, acetyltriethylcitrate and triethylcitrate, adding the resultant medicine solution to water, which forms, with the said plasticizer-medicine solution, a separate layer, adding spray-dried, emulsifiable polyvinyl acetate and agitating the whole until a smooth paste is formed, said paste containing not more than substantially 28.9% by weight of water, nor more than substantially 56% by weight of polyvinyl acetate powder, and a combined water and plasticizer content substantially from 35% to 50% by weight and a ratio of said plasticizer to polyvinyl acetate of substantially from 35% to 80% by weight of polyvinyl acetate.

5. Method of preparing medicated, topical, non-tacky, fast-drying, spreadable ointment of pastelike consistency comprising dissolving a water-insoluble medicine, soluble in at least one non-toxic, non-irritating, non-sensitizing, non-water miscible plasticizer selected from the group consisting of diethylphthalate, di-iso-octylphthalate, dioctylphthalate, ethyl phthalyl ethylglycolate, butyl phthalyl butylglycolate, diphenyl-2-ethylhexylphosphate, acetyltributyl citrate, acetyltriethylcitrate and triethylcitrate, adding the resultant medicine solution to a liquid polyvinyl acetate water emulsion, which forms, with the said plasticizer-medicine solution, a separate layer, adding spray-dried, emulsifiable polyvinyl acetate powder, and agitating the whole until a smooth paste is formed, said paste containing not more than substantially 28.9% by weight of water, nor more than substantially 56% by weight of polyvinyl acetate, and a combined water and plasticizer content substantially from 35% to 50% by weight and a ratio of said plasticizer to polyvinyl acetate of substantially from 35% to 80% by weight of polyvinyl acetate.

6. A topical, non-tacky, spreadable ointment base capable of holding a uniformly dispersed solid medicine, said base being of pastelike consistency substantially free from thickening agents, tackifiers and volatile organic solvents which forms fast-drying films and permits passage of water vapor and medicines, said base containing spray-dried, self-emulsifiable polyvinyl acetate powder, and said base containing not more than substantially 56% polyvinyl acetate by weight and not more than substantially 28.9% by weight of water, and at least one non-toxic, non-irritant, non-sensitizing plasticizer which is compatible with self-emulsifiable spray-dried polyvinyl acetate in the presence of water and selected from the group consisting of those alkyl esters, aryl esters and alkyl-aryl esters which are liquid and acceptable as plasticizers in film-forming material used in contact with food and which are esters of at least one of the following acids: adipic, citric, glycolic, lactic, lauric, maleic, oleic, phospheric, phthalic, ricinoleic, salicylic, sebacic, stearic and tartaric, the combined water and plasticizer content of said base being substantially 35% to 50% by weight thereof, and the ratio of said plasticizer being substantially 35% to 80% by weight of the total polyvinyl acetate.

7. Method of preparing medicated, topical, non-tacky, fast-drying, spreadable ointment of pastelike consistency comprising dissolving a water-soluble medicine in water, adding the resultant water-medicine solution to at least one non-toxic, non-irritating, non-sensitizing plasticizer which is compatible with self-emulsifiable spray-dried polyvinyl acetate in the presence of water and selected from the group consisting of those alkyl esters, aryl esters and alkyl-aryl esters which are liquid and acceptable as plasticizers in film-forming material used for contact with food and which are esters of at least one of the following acids: adipic, citric, glycolic, lactic, lauric, maleic, oleic, phospheric, phthalic, ricinoleic, salicyclic, sebacic, stearic and tartaric, to form a separate layer with the water phase, adding spray-dried, emulsifiable polyvinyl acetate powder, and agitating the whole until a smooth paste is formed, said paste containing not more than substantially 28.9% by weight of water, nor more than substantially 56% by weight of polyvinyl acetate, and a combined water and plasticizer content substantially from 35% to 50% by weight and a ratio of said plasticizer to polyvinyl acetate of substantially from 35% to 80% by weight of polyvinyl acetate.

8. Method of preparing medicated, topical, non-tacky, fast-drying, spreadable ointment of pastelike consistency comprising dissolving a water-soluble medicine in a liquid polyvinyl acetate water emulsion, adding the resultant medicine solution to at least one non-toxic, non-irritating, non-sensitizing plasticizer which is compatible with self-emulsifiable spray-dried polyvinyl acetate in the presence of water and selected from the group consisting of those alkyl esters, aryl esters and alkyl-aryl esters which are liquid and acceptable as plasticizers in film-forming material used in contact with food and which are esters of at least one of the following acids: adipic, citric, glycolic, lactic, lauric, maleic, oleic, phospheric, phthalic, ricinoleic, salicylic, sabacic, stearic and tartaric, to form a separate layer with the water phase, adding spray-dried, emulsifiable polyvinyl acetate powder, and agitating the whole until a smooth paste is formed, said paste containing not more than substantially 28.9% by weight of water, nor more than substantially 56% by weight of polyvinyl acetate, and a combined water and plasticizer content substantially from 35% to 50% by weight and a ratio of said plasticizer to polyvinyl acetate of substantially from 35% to 80% by weight of polyvinyl acetate.

9. Method of preparing medicated, topical, non-tacky, fast-drying, spreadable ointment of pastelike consistency comprising dissolving a water-insoluble medicine, soluble in at least one non-toxic, non-irritating, non-sensitizing plasticizer which is compatible with self-emulsifiable spray-dried polyvinyl acetate in the presence of water and selected from the group consisting of those alkyl esters, aryl esters and alkyl-aryl esters which are liquid and acceptable as plasticizers in film-forming material used in contact with food and which are esters of at least one of the following acids: adipic, citric, glycolic, lactic, lauric, maleic, oleic, phospheric, phthalic, ricinoleic, salicyclic, sebacic, stearic and tartaric, adding the resultant medicine solution to water, which forms, with said plasticizer-medicine solution, a separate layer, adding spray-dried, emulsifiable polyvinyl acetate and agitating the whole until a smooth paste is formed, said paste containing not more than substantially 28.9% by weight of water, nor more than substantially 56% by weight of polyvinyl acetate powder, and a combined water and plasticizer content substantially from 35% to 50% by weight and a ratio of said plastizer to polyvinyl acetate of substantially from 35% to 80% by weight of polyvinyl acetate.

10. Method of preparing medicated, topical, non-tacky, fast-drying, spreadable ointment of pastelike consistency comprising dissolving a water-insoluble medicine, soluble in at least one non-toxic, non-irritating, non-sensitizing plasticizer which is compatible with self-emulsifiable spray-dried polyvinyl acetate in the presence of water and selected from the group consisting of those alkyl esters, aryl esters and alkyl-aryl esters which are liquid and acceptable as plasticizers in film-forming material used in contact with food and which are esters of at least one of the following acids: adipic, citric, glycolic, lactic, lauric, maleic, oleic, phospheric, phthalic, ricinoleic, salicyclic, sebacic, stearic and tartaric, adding the resultant medicine solution to a liquid polyvinyl acetate water emulsion, which forms, with the said plasticizer-medicine solution, a separate layer, adding spray-dried, emulsifiable polyvinyl acetate powder, and agitating the whole until a smooth paste is formed, said paste containing not more than substantially 28.9% by weight of water, nor more than substantially 56% by weight of polyvinyl acetate, and a combined water and plasticizer content substantially from 35% to 50% by weight and a ratio of said plasticizer to polyvinyl acetate of substantially from 35% to 80% by weight of polyvinyl acetate.

No references cited.

LEWIS GOTTS, *Primary Examiner.*

FRANK CACCIAPAGLIA, JR., *Examiner.*